United States Patent

Coyle et al.

[15] 3,676,609

[45] July 11, 1972

[54] CAPACITOR ENERGIZED CHANNEL STEPPING MEANS FOR BATTERY OPERATED TAPE PLAYERS

[72] Inventors: Jan Robert Coyle, 514 East Ghent Avenue; Robert Walter Stevens, 1727 Via Alegre, both of San Dimas, Calif. 91773

[22] Filed: Feb. 24, 1970

[21] Appl. No.: 13,711

[52] U.S. Cl. ........179/100.1 R, 179/100.2 MD, 179/100.2 S, 179/100.3 B, 179/100.3 D, 320/1

[51] Int. Cl. ........G11b 21/08

[58] Field of Search ........179/100.2 CA, 100.2 MD, 100.2 S, 179/100.3 B, 100.3 D, 100.1 R; 274/4 A, 11 A; 320/1; 317/151

[56] References Cited

UNITED STATES PATENTS

| | | | |
|---|---|---|---|
| 3,452,162 | 6/1969 | Ward | 179/100.2 CA |
| 2,587,123 | 2/1952 | Dunning | 317/151 |
| 3,146,391 | 8/1964 | Walker | 320/1 |
| 2,763,826 | 9/1956 | Friedman | 320/1 |
| 3,424,871 | 1/1969 | Dombacher | 179/100.1 R |

FOREIGN PATENTS OR APPLICATIONS

| | | | |
|---|---|---|---|
| 844,194 | 7/1952 | Germany | 317/151 |

*Primary Examiner*—Howard W. Britton
*Assistant Examiner*—Raymond F. Cardillo, Jr.
*Attorney*—Newton H. Lee, Jr.

[57] ABSTRACT

A tape deck and a power source therefor, the tape deck having a pick-up head which is progressively and repetitively shifted through a range of positions relative to a multi-track tape which moves past the head, shifting of the head being accomplished by a solenoid which is in a circuit with a capacitor adapted to energize the solenoid in response to completion of the capacitor-solenoid circuit either manually or automatically.

4 Claims, 2 Drawing Figures

INVENTOR.
JAN R. COYLE
BY ROBERT W. STEVENS
Newton H. Lee, Jr.

INVENTOR
JAN R. COYLE
BY ROBERT W. STEVENS

CAPACITOR ENERGIZED CHANNEL STEPPING MEANS FOR BATTERY OPERATED TAPE PLAYERS

BACKGROUND OF THE INVENTION

A well known type of tape deck or tape player involves the use of an endless loop tape cartridge which is adapted to be inserted into the tape deck or player so that the tape is engaged between a drive capstan and a pressure roller and continuously moved past a pick-up device or head. The head is progressively moved through a range of positions transversely of the tape so as to enable the playing of different bands or tracks of recorded material. The progressive movement of the head is typically effected by the manual closure of a stepping circuit switch or by the automatic completion of the stepping circuit by a switch foil carried by the tape at the end of a section of recorded matter, say following each musical piece on the tape, the switch foil bridging spaced contacts in the switching circuit.

Such tape decks or players are commonly employed in vehicles, such as buses, automobiles, boats, or the like, where the source of electrical power is the usual battery of the vehicle, say a 12 volt battery. Without difficulty, such tape decks may be also employed with the usual house current by the use of a suitable transformer. However, the use of such tape decks or players as a fully portable means of entertainment poses problems in respect of the power source.

In order to avoid the need for a heavy and unwieldy battery source for portable tape players, a pack of small batteries, say of the type employed in flashlights and being rated at 1½ volts each, may be employed to provide the necessary electricity to operate the tape player, that is, to energize the drive motor for the capstan, drive the speaker magnets and the audio circuitry therefor, and to energize the stepping circuit. However, the use of such small batteries poses problems respecting the effective battery life.

In this connection, the usual tape player of the type here involved will function to reproduce the recorded material on the tape with a very small current drain on the battery source, the necessary current being on the order of 0.3 amp. Accordingly, a pack of small batteries is capable of energizing the player for a substantial period of time, except for the fact that the stepping of the head or pick-up between recorded pieces or tunes or when a change is desired, involves the need for energizing the stepping motor at frequent intervals, and such stepping solenoids require energization with a comparatively high current on the order of 3 amps. over the period of the solenoid stroke, resulting in a substantial and repetitive drain on the power source or batteries. As a result, easily portable tape decks or players, energized by a light-weight battery or battery pack, have not been wholly practical.

SUMMARY OF THE INVENTION

The present invention provides a tape deck or tape player with practical portability by substantially reducing the drain on the power source during use of the tape deck or player.

More particularly, the invention provides means for applying an energizing pulse to the stepping motor or solenoid which adjusts pick-up or head, either when the player is manually operated to change the position of the head or the head is shifted automatically by means of a switching strip or foil incorporated in the tape.

In accomplishing the foregoing general objectives, the invention involves the provision of a stepping motor energizing circuit which includes a capacitor which is charged during operation of the tape player with a very small current until the capacitor is capable of a 12 volt discharge, and automatic or manual switching means are closeable to effect energization of the stepping motor by the capacitor, thus eliminating the need for supplying the relatively high current and voltage to the stepping motor from the main source of power. Such a system, therefore, enables a compact, lightweight source of electricity to be employed, such as a pack of small 1½ volt flashlight batteries, and the battery source will have substantially improved useful life.

Such a system enables the usual battery operated tape deck or player, such as is customarily employed in automobiles and boats, to be practically rendered truly portable. In addition, it will be understood that such portable devices may also be operable by the usual house current which may be employed to recharge the battery source.

While the present invention is particularly adapted to render a tape deck or cartridge portable and capable of sustained operation for a substantial period of time, it will also be understood that the invention is also of advantage in any battery operated tape deck or player installation, since the drain on the battery source is substantially reduced when the player is operated under conditions where the battery source is not undergoing charge by a generator, say for example, when the engine of an automobile or boat is not operating.

Accordingly, it is within the purview of the present invention to provide a capacitor discharge system which is incorporated in a tape deck or player for energizing the stepping motor or solenoid. Alternatively, the capacitor discharge system may be incorporated in an assembly including a battery or battery pack, the assembly being adapted to receive a tape deck or player and adapted to be plugged into the tape deck or player. Such an assembly, it will be understood, may include one or more speakers, and under these circumstances, the tape deck or player may be readily combined either with the battery pack assembly or removably mounted in an automobile, boat, or other vehicle.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

DESCRIPTION OF THE PREFERRED EMBODIMENT

Figure 1:
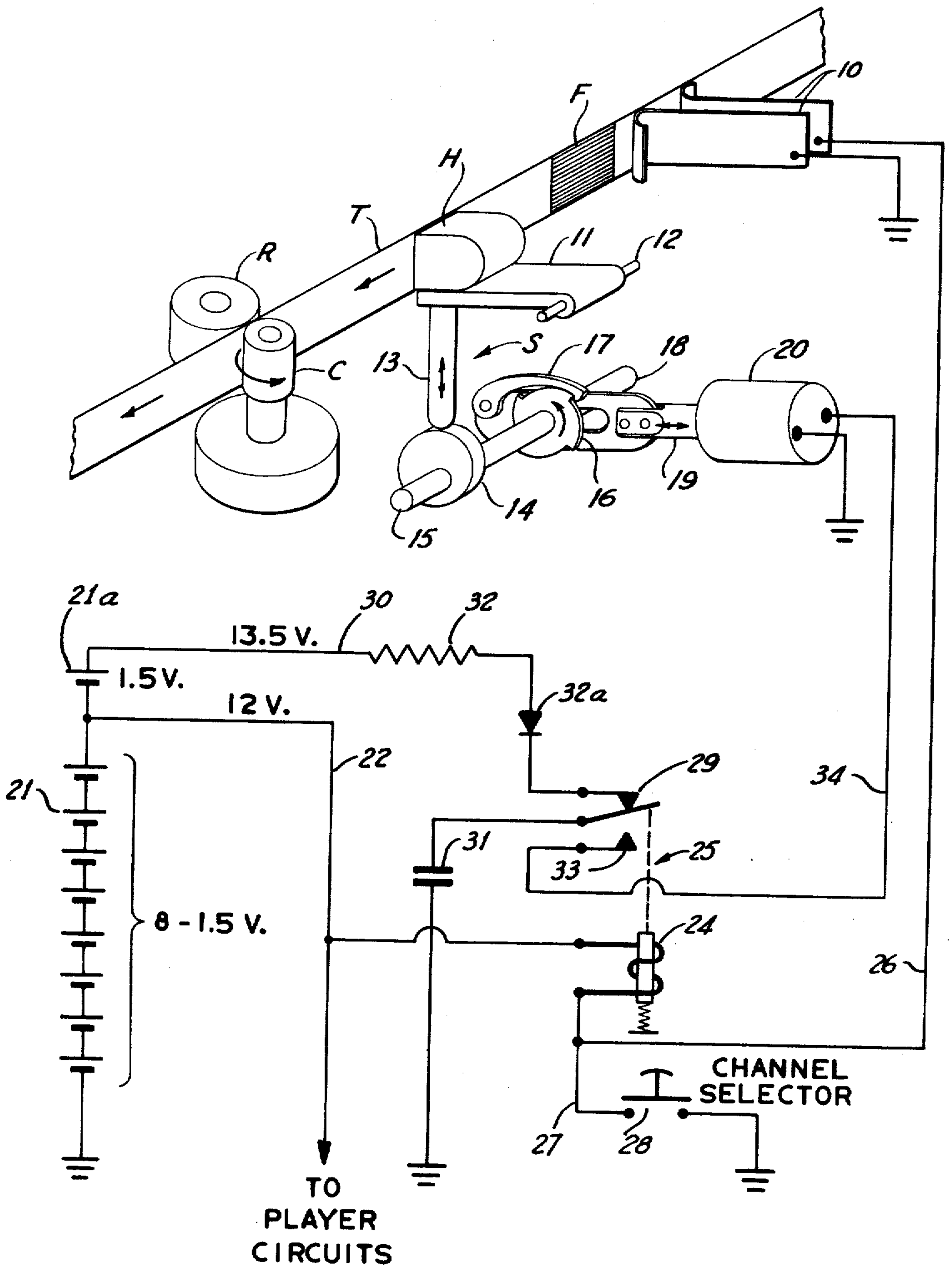
FIG. 1 is a schematic illustration of a battery powered tape deck system in accordance with the invention.

Referring first to FIG. 1, the invention is shown as incorporated in the channel selecting control system of tape player of the type adapted to reproduce or play endless tape cartridges wherein the tape has multiple channels or tracks of recorded material or tunes, with only essential elements of the player illustrated to better disclose this application of the invention. It will be understood, in this connection, without requiring illustration or elaboration herein, that the tape player, in addition to the channel or track selector, will have what may be termed player circuits including one or more speakers and the usual audio circuitry.

In any event, the tape transport and pick up means of a typical tape deck will be seen in FIG. 1 to include a drive capstan C against which the tape T is held by a pressure roller R so that the tape T is caused to move in a path indicated by the arrows. The tape moves past a pick up head H. Incorporated in the tape at spaced locations, say between tunes or pieces recorded on the tape are switching foils, one of which is shown at F, whereby, as will be hereinafter described, the head H is caused to be automatically shifted to a different channel or track of the tape T when the gap between a pair of brushes or contacts 10, 10 is bridged.

Shifter means S for cyclically effecting such shifting of the pick up or head H are generally illustrated as including a support 11 for the head H, the support being pivotally mounted on a shaft 12. A pusher 13 is engaged beneath the support 11 to move the support 11 upwardly and to allow downward movement of the support, with resultant similar movement of the head H, in response to step-by-step rotation of a cam 14, the profile of which engages the pusher 13. This cam 14 is illustratively rotatable with a shaft 15 on which is a ratchet wheel 16. A pawl 17 carried by a reciprocable link 18 is adapted to effect step-by-step rotation of the shaft 15, and thus rotation of the cam 14, in response to reciprocation of the armature 19 of a stepping motor or solenoid 20.

Typically, the solenoid is in a circuit adapted to be energized, automatically when the switching foil F bridges the contacts 10, or manually when the usual channel selector button or switch is actuated. In addition, it is typical that the electric motor drive for the capstan C, the speakers, not shown, and the audio circuitry, requires a small current on the order of about 0.3 Amp. However, in such tape players, the current required to step the head H by energizing the stepping motor or solenoid 20 involves a current of about 3 Amps, imposing substantial drain on the electrical source. When a storage battery or batteries constitute the source, the drain on the battery source will rapidly render the system ineffective, unless the battery source can be recharged, this being particularly a problem if the battery source is to be small and light weight such as a pack of small low power batteries, such as the typical 1½ volt flashlight batteries.

In order to obviate this problem and to enable longer term operation of a battery powered tape player system, the present invention involves applying the energizing current to the stepping motor or solenoid 20 from a source which is separate from the battery source for the other components of the tape player. More particularly, the separate source of current for the stepping motor is a charging capacitor, which can be charged to capacity during the period of a tune or piece on the tape, so as to apply a full charge at the necessary current to energize the stepping motor or solenoid, whereby no large drain on the main power source is made with each change of channel of the player system.

Still with reference to FIG. 1, such a charging capacitor source for energizing the stepping motor or solenoid 20 is shown as being incorporated in the tape player, the usual amplifier and speaker details being omitted for the sake of simplicity of illustration. In this embodiment a battery source of electricity is shown at 21 as, for example, comprising eight 1.5 volt batteries connected in series to energize the usual 12 volt player circuits, including driving the capstan C and energizing the audio circuitry and speakers. Thus, a conductor 22 leads to the "PLAYER CIRCUITS," as shown by the legend. Also connected to the source, by a conductor 23 is the winding 24 of a channel selector relay generally indicated at 25. The circuit for the relay 25 is normally open, but may be completed in either an automatic or a manual mode.

In order to effect energization of the cannel relay 25 in the automatic mode, the winding 24 is in a circuit including the conductor 26 leading to one of the spaced contacts 10, the other contact 10 being grounded, so that the switching foil F on the tape T will close the circuit including the relay winding 24 when the foil bridges the contacts 10. The manual mode for energizing the winding 24 of the channel selector involves connection of the winging 24 by a conductor 27 to one contact of a normally open "CHANNEL SELECTOR" switch 28, the other contact of which is grounded, so that manual closure of the switch 28 will complete the circuit including the relay winding 24.

The relay 25 includes switching means which include normally closed contacts 29 which connect a source conductor 30, with a charging capacitor 31, whereby, so long as the relay contacts 29 are closed, the capacitor is charged by the battery source 21. A current limiting resistor 32 is interposed between the battery source 21 and the capacitor 31 to limit the drain on the battery source to a low current level, and a diode 32a is also preferably included in the circuit between the capacitor 31 and the source 21.

Since, typically, in order to fully charge a capacitor to a capacity to assure a 12 volt discharge, more than 12 volts must be applied to the capacitor, a supplemental battery source 21a, say in the form of an additional 1.5 volt battery is interposed in the circuit to the capacitor 31, between the resistor 32 and connection of the player circuit and relay conductor 22 to the source 21, whereby the conductor 30 supplies the capacitor 31 from a 13.5 volt combined source, consisting of the battery source 21 and the supplemental battery source 21a. Under these circumstances, the capacitor 31 is charged to a 12 volt discharge capacity over a period of time by a current held at a low level by the resistor 32, so as to minimize the drain on the battery source, to, say, 0.3 Amp to perform all of the functions, except for energization of the stepping motor or solenoid 20.

The capacitor 31 constitutes a separate energy source for the stepping motor or solenoid 20. Hence, the switching means of the relay 25 includes a normally open contact 33, closeable upon energization of the relay 25 to connect the capacitor 31 to a conductor 34 leading to the solenoid 20. Simultaneously, of course, when the switch means of the relay 25 connects the capacitor 31 to the solenoid 20, it also disconnects the source 21, 21a from the capacitor, but the source 21 is still connected to the "PLAYER CIRCUITS" and to the winding 24 of the relay 25. The relay will remain energized and contacts 29 closed, only so long as it takes for the switching foil F to break contact with one of the brushes 10 or so long as the "CHANNEL SELECTOR" switch is held closed.

While the invention, as illustrated in FIG. 1, contemplates the application of the separate capacitor source 31 for stepping the head H to a tape player unit, the invention also contemplates utilization of the separate source capacitor in a portable power pack unit, including the desired battery source and one or more speakers, adapted to accommodate the tape deck by plugging in appropriate connecting jacks.

Figure 2:
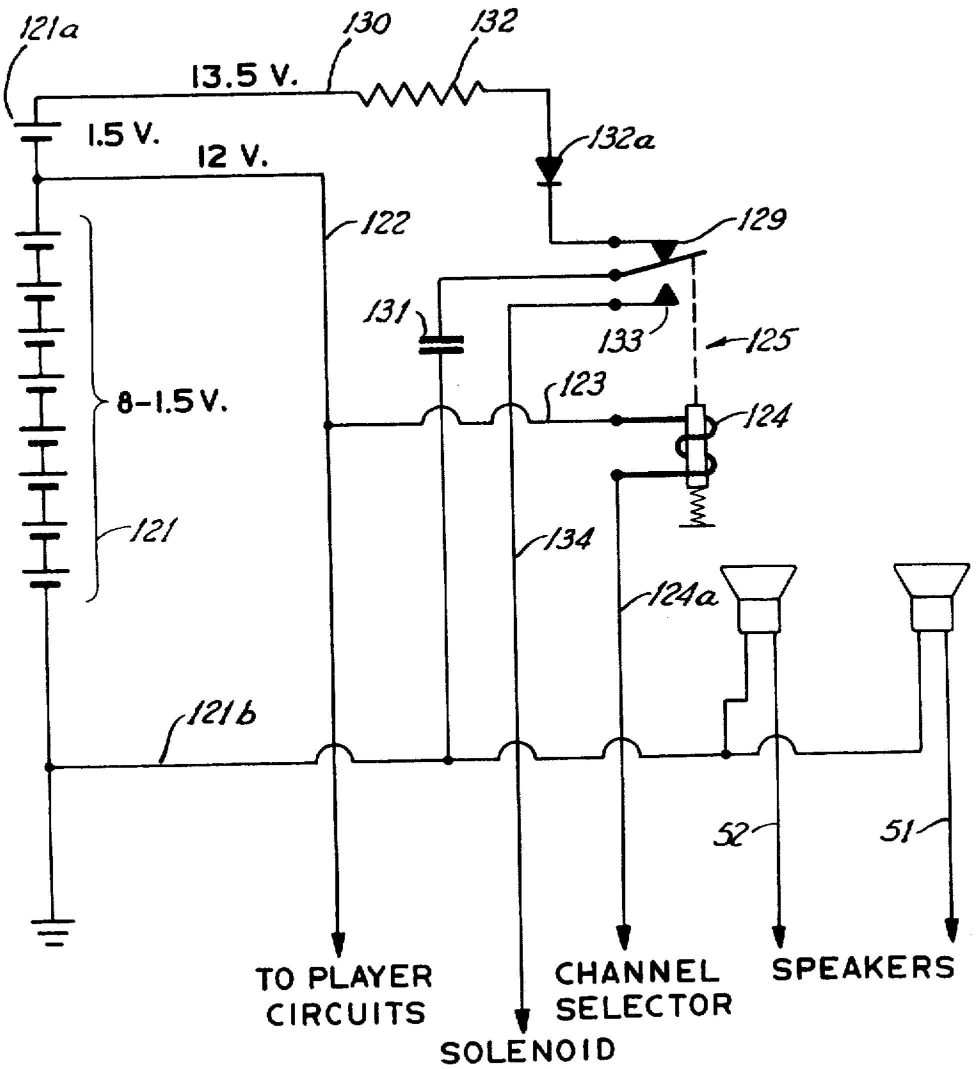
FIG. 2 is a schematic illustration of a portable battery pack system to be combined with a tape deck in accordance with the invention.

Accordingly, as seen in FIG. 2, the invention embodies a power source in the illustrative form of a pack of eight 1.5 volt batteries, indicated at 121, and a supplemental 1.5 volt battery source 121a. Connected to the battery source 121 is a conductor 122 which leads to a point for connection, as by a jack not shown, to the "PLAYER CIRCUITS" of the tape deck, including the usual tape transport drive circuitry and the audio circuitry. The output from the audio circuitry is connectable by jacks to the speaker conductors S1 and S2, the speakers being connected to a common ground conductor 121b. Leading from the source, as by connection to the conductor 122, is a conductor 123 which is connected to the winding 124 of the channel selector relay 125. Since, under these circumstances, the channel selecting function, either automatic or manual, is accomplished in the tape player, as previously described, the coil winding 124 is adapted to be connected by a conductor 124a which, by a jack, is connectable to the channel selector means of the tape player, so that the winding 124 will be energized automatically by the switching foils of a tape or manually by the closure of the usual channel selector switch.

Like the relay 25, previously described, the relay 125, in the present embodiment, has switching means including normally closed contacts 129 which connect the source conductor 130 to the charging capacitor 131. Interposed between the battery 121a and the capacitor 131 is the current limiting register 132 and the diode 132a, whereby the charge impressed on the capacitor is regulated. The switching means of the relay 125 also includes a contact 133 connectable by a conductor 134 and a jack to the channel stepping solenoid of the tape player.

From the foregoing it is now apparent that when a portable unit having a battery source such as that shown in FIG. 2 is connected to the usual tape deck, whereby to (a) connect the speaker conductors S1 and S2 to the audio output of the tape player, (b) connect the "CHANNEL SELECTOR" conductor 124a to the parallel automatic and manual switching means of the player; and (c) to connect the source conductor 122 to the "PLAYER CIRCUITS," a portable assemblage is provided. In operation, the channel selecting shift of the head will be caused by energization of the stepping motor, such as the motor 20, previously described, with the charge stored by the capacitor 131. Thus, substantial increase of battery life will be realized.

We claim:

1. Tape deck channel stepping means, for energizing the stepping motor to cyclically shift the pick-up head of the tape deck, comprising: a battery source of electrical energy, first circuit means for connecting said battery source to the audio circuitry of the tape deck, a capacitor, second circuit means for connecting said capacitor to aid battery source, third circuit means for connecting said capacitor to said stepping motor, switch means normally completing said second circuit means and opening said third circuit means and operable to open said second circuit means and close said third circuit means, and means for effecting operation of said switching means, said battery source including a main battery source and a supplemental battery source, said first circuit means being connected to said main battery source, and said second circuit means being connected to said main battery source and to said supplemental battery source.

2. Tape deck channel stepping means as defined in claim 1, including a resistor interposed between said capacitor and said supplemental battery source.

3. In tape deck apparatus having electrically operated tape transporting drive means, a pick-up head, cyclically electrically operated means including a stepping motor for stepping the position of said head relative to the tape, a battery source of electrical energy for said electrically operated means, the improvement comprising means separate from said electrically operated means including a capacitor for energizing said stepping motor, and switching means for connecting said capacitor to said battery source to charge said capacitor and for connecting said capacitor to said stepping motor to discharge the capacitor and energize the stepping motor and including a supplemental battery source connected to the first-mentioned battery source and also connectable to said capacitor by said switching means.

4. Tape deck apparatus as defined in claim 3, including a resistor interposed between said supplemental source and said capacitor.

* * * * *